(12) United States Patent
Lovegreen et al.

(10) Patent No.: US 6,970,100 B2
(45) Date of Patent: Nov. 29, 2005

(54) TEMPERATURE TAG AND SYSTEM FOR MONITORING, RECORDING, AND REPORTING TEMPERATURE READINGS

(75) Inventors: Kenneth J. Lovegreen, Lake Kiowa, TX (US); James Livingston, Hickory Creek, TX (US); Russell P. Blink, Plano, TX (US)

(73) Assignee: Long Range Systems, Inc., Dallas, TX (US)

( * ) Notice: Subject to any disclaimer, the term of this patent is extended or adjusted under 35 U.S.C. 154(b) by 392 days.

(21) Appl. No.: 10/189,842

(22) Filed: Jul. 5, 2002

(65) Prior Publication Data

US 2003/0006907 A1    Jan. 9, 2003

Related U.S. Application Data

(60) Provisional application No. 60/303,267, filed on Jul. 5, 2001.

(51) Int. Cl.[7] .......................... G08B 1/08; G08B 13/14; G08B 17/00; G01D 21/00; G01K 1/16
(52) U.S. Cl. .......................... 340/870.17; 340/539.27; 340/571; 340/581; 340/584; 340/585; 374/102; 374/120; 73/866.5
(58) Field of Search ................ 340/870.16–870.17, 340/539.27, 581, 584–589, 622, 572.8; 374/102, 374/120; 73/866.5

(56) References Cited

U.S. PATENT DOCUMENTS

| | | | | |
|---|---|---|---|---|
| 5,211,476 | A | * | 5/1993 | Coudroy ...................... 374/102 |
| 5,252,962 | A | * | 10/1993 | Urbas et al. ........... 340/870.17 |
| 5,481,262 | A | * | 1/1996 | Urbas et al. ........... 340/870.17 |
| 5,682,149 | A | * | 10/1997 | Hofman .................. 340/870.17 |
| 5,900,824 | A | * | 5/1999 | Hayashi .................. 340/870.11 |
| 5,907,292 | A | * | 5/1999 | Ahr ........................ 340/870.31 |
| 5,910,765 | A | * | 6/1999 | Slemon et al. .............. 340/517 |
| 6,046,674 | A | * | 4/2000 | Irwin et al. ............ 340/539.28 |
| 6,054,935 | A | * | 4/2000 | Urbas et al. ........... 340/870.17 |
| 6,366,206 | B1 | * | 4/2002 | Ishikawa et al. ......... 340/573.1 |
| 6,501,390 | B1 | * | 12/2002 | Chainer et al. ........ 340/870.16 |
| 6,617,963 | B1 | * | 9/2003 | Watters et al. ........... 340/10.41 |

* cited by examiner

Primary Examiner—Michael Horabik
Assistant Examiner—Kimberly Jenkins
(74) Attorney, Agent, or Firm—Steven W. Smith

(57) ABSTRACT

A temperature tag and system for sensing and reporting an internal temperature reading inside a container. The temperature tag mounts on an outside surface of the container, and a shaft with a temperature sensor extends through the side of the container and senses the internal temperature reading. A plurality of readings may be recorded at a predefined sampling rate and stored in a data memory. The temperature tag then sends the temperature readings to a reader device that presents the temperature readings to a user. The reader device may trigger the temperature tag to send the temperature readings with a signal such as an infrared (IR) signal, a radio frequency (RF) signal, and the like. The temperature readings may be analyzed in the temperature tag, the reader device, or may be downloaded to a computer to determine if an alarm condition exists.

13 Claims, 2 Drawing Sheets

TEMPERATURE TAG AND SYSTEM FOR MONITORING, RECORDING, AND REPORTING TEMPERATURE READINGS

PRIORITY STATEMENT UNDER 35 U.S.C. § 119(e) & 37 C.F.R. § 1.78

This nonprovisional application claims priority based upon the prior U.S. provisional patent application entitled, "Temperature Monitoring and Recording Tag", application No. 60/303,267, filed Jul. 5, 2001, in the names of James Livingston, Russell P. Blink, and Kenneth J. Lovegreen.

BACKGROUND OF THE INVENTION

1. Technical Field of the Invention

This invention relates to temperature monitoring systems and, more particularly, to a temperature tag that is placed on shipped goods to monitor and record the internal temperature of a shipping container at a defined sampling rate during shipment of the goods.

2. Description of Related Art

Some goods, such as food items, require that their temperature be maintained within an acceptable range during shipping and handling. In the food industry today, foods must be shipped for long distances from farms or processing plants, to distribution centers, and then to their final destinations at restaurants or grocery stores. In many cases, the trips may take several days and require that the food be refrigerated or frozen during the trip. It is important for the freshness and safety of the food that the temperature be maintained in a safe range throughout the trip. For some foods, particularly meats, fish, and poultry, even small temperature excursions of short duration outside the safe range can be dangerous since these foods tend to spoil quickly.

It is known in the prior art for distributors of frozen and refrigerated goods to place temperature sensitive stickers on the outside of the boxes in which the food is shipped. If the temperature on the outside of a box rises above a threshold limit at any time during the trip from the distribution center to the final destination, the sticker on the outside of the box changes color. At the final destination, the receiver can check the stickers on the outside of the boxes to ensure that none of them have been exposed to excessive temperatures.

The disadvantage of temperature sensitive stickers is that they do not provide enough information to accurately determine whether the food inside the boxes has been adversely affected by temperature changes. A short duration temperature rise on the outside the box may cause the sticker to change colors without affecting the food inside the box. This may occur in hot climates, for example, when moving the boxes from a freezer to a refrigerated truck. No harm is caused to the food unless the duration of the rise in temperature is long enough to begin thawing the food. The temperature sensitive stickers, however, do not give a history or duration of the temperature variations.

It would be advantageous to have a temperature tag that is placed on shipped goods to monitor and record the temperature inside the shipping container at a defined sampling rate during shipment of the goods. A reader device at the final destination could then interrogate the tag and present the internal temperature data to a user. The present invention provides such a temperature tag and a system that includes the tag and the reader device.

SUMMARY OF THE INVENTION

In one aspect, the present invention is directed to a temperature tag for sensing and recording an internal temperature inside a container. The tag includes means for mounting a portion of the temperature tag on an exterior surface of the container; a temperature sensor located inside the container for sensing the internal temperature in the container; a data memory connected to the temperature sensor for recording the sensed internal temperature; and means for retrieving the recorded temperature and providing the recorded temperature to a user upon demand.

The temperature sensor may be located on a shaft that extends from the portion of the temperature tag mounted on the exterior surface of the container, through a side of the container, to the inside of the container. In addition, the means for retrieving the recorded temperature and providing the recorded temperature to a user may include a data output port, and a microprocessor that retrieves the recorded temperature from the data memory and sends the recorded temperature to the data output port. The microprocessor may control the temperature sensor to report temperature readings at a predefined sampling rate, and may analyze reported temperature sensor readings to determine whether a predefined alarm condition exists.

In yet another aspect, the present invention is directed to a system for sensing and reporting an internal temperature reading inside a container. The system includes a temperature tag that mounts on the container and senses the internal temperature reading inside the container. The temperature tag then sends the sensed internal temperature reading to a reader device that presents the internal temperature reading to a user. The reader device may trigger the temperature tag to send the temperature readings with a signal such as an infrared (IR) signal, a radio frequency (RF) signal, and the like. The temperature readings may be analyzed in the reader device, or may be downloaded to a computer to determine if an alarm condition exists.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
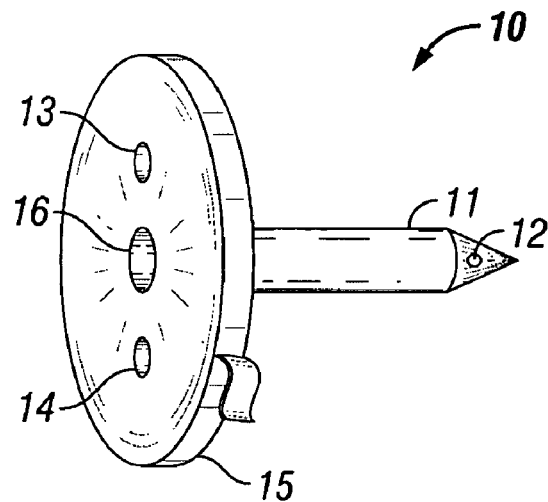
FIG. 1 is a perspective view of the preferred embodiment of the temperature tag of the present invention.

FIG. 1 is a perspective view of the preferred embodiment of the temperature tag 10 of the present invention. The present invention is a temperature sensing and recording device ("temp tag") that may be punched through the side of a box to read and record the temperature inside the box. During food distribution from a distributor to end-users, the distributor may place a temp tag on each box of food being shipped. A probe 11 includes a temperature sensor 12 mounted near the tip. When the probe is punched through the side of a box, such as a cardboard box used for shipping frozen foods, the temperature sensor senses the temperature inside the box. Also shown in FIG. 1 is a trigger input port 13, a data output port 14, a battery pull strip 15, and an optional alert indicator 16. These are discussed below in connection with FIGS. 2 and 3.

Figure 2:
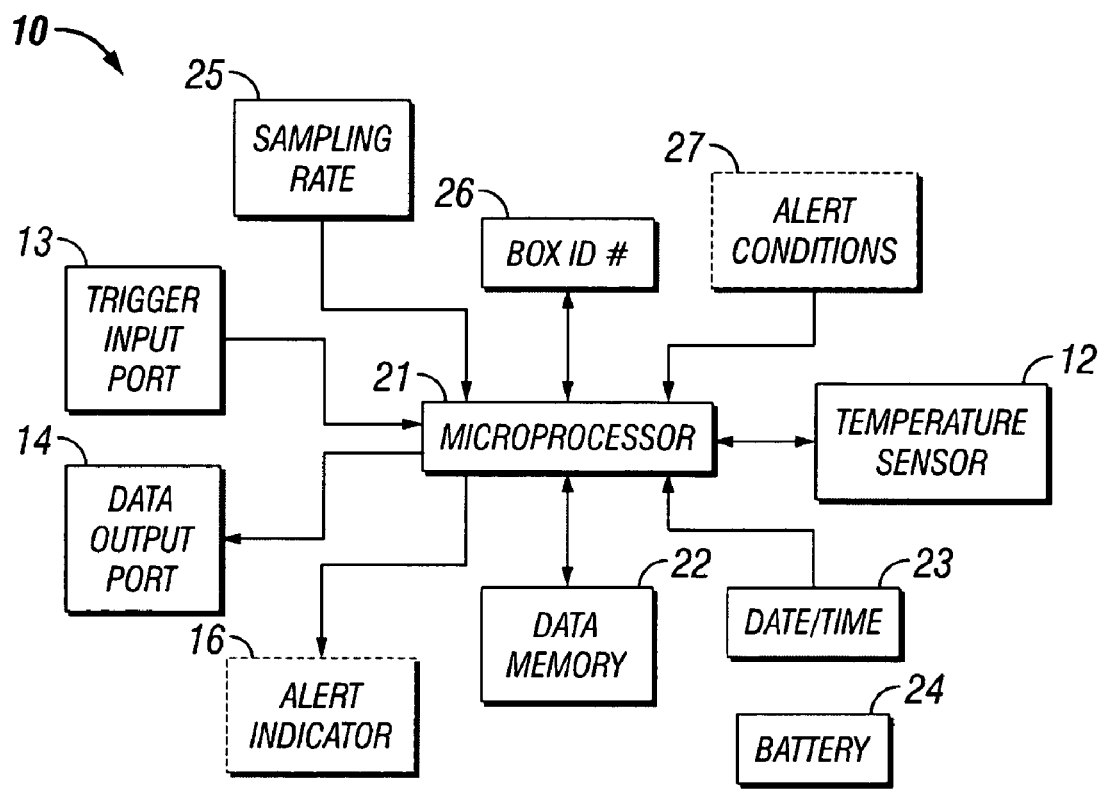
FIG. 2 is a simplified block diagram of the preferred embodiment of the temperature tag of the present invention.

FIG. 2 is a simplified block diagram of the preferred embodiment of the temp tag 10 of the present invention. The temp tag is equipped with the temperature sensor 12, the trigger input port 13, the data output port 14, a microprocessor 21, a data memory 22, a date/time clock 23, and a battery 24. The microprocessor may be programmed with sampling rates 25 to sample the temperature at different rates, depending on the type of food being shipped. For example, for foods such as meats, fish, and poultry, the temperature inside the box may be sampled more often than for other types of food. For each temperature sample taken, the temp tag may record the date, time, and temperature. The processor may also be programmed with a Box ID number 26 so that the temperature readings can be correlated to the proper box after they are downloaded. Optionally, the microprocessor may also be programmed with alert conditions 27 that activate the alert indicator 16. The alert conditions and alert indicator are preferably implemented in the reader which is shown and described in FIG. 3.

Figure 3:
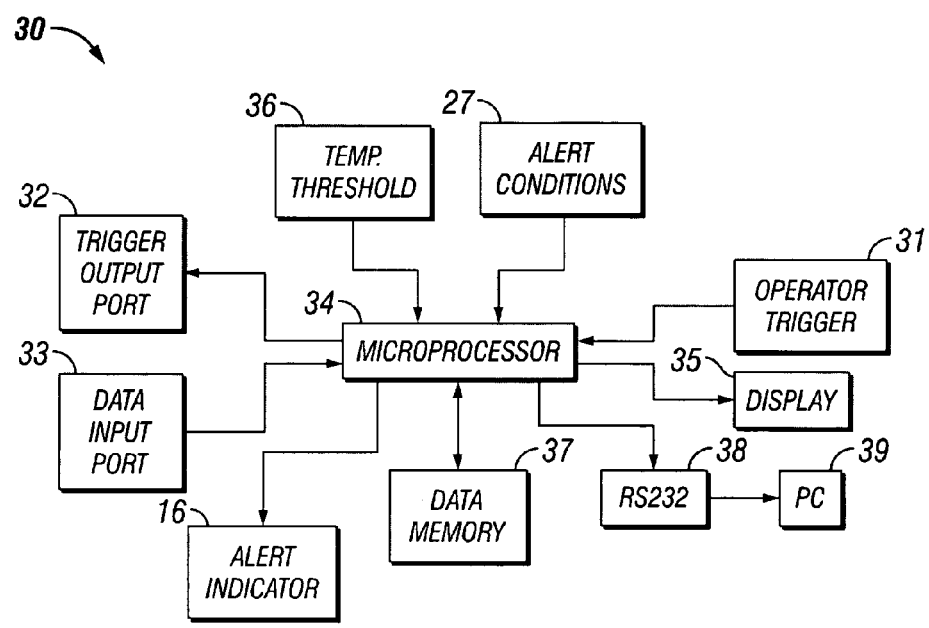
FIG. 3 is a simplified block diagram of a reader device utilized for interrogating the temperature tag and downloading the recorded temperature data.

FIG. 3 is a simplified block diagram of a reader device 30 utilized for interrogating the temperature tag and downloading the recorded temperature data. When a shipment of boxes with temp tags reaches its final destination, the receiving operator uses a reader device to download the data stored in each temp tag. The reader may be a handheld unit that is utilized by the operator monitoring the unloading of the boxes. When the operator targets a particular temp tag and activates an operator trigger 31, the reader interrogates the targeted temp tag. The mechanism for triggering and downloading the data may be based on infrared (IR) or visible light transmissions, short range radio frequency (RF) transmissions similar to those used for RF identification (RFID) tags, direct electrical contact, direct mechanical contact, or any other suitable technology for making a data connection.

If IR technology is used, a trigger output port 32 on the reader sends an IR signal to the trigger input port 13 on the temp tag 10. When the temp tag receives the triggering signal, the tag microprocessor 21 downloads from the data memory 22, the temperature data taken in each sample along with the time and date, and the box ID number 26. This information is then sent in an IR signal from the data output port 14 to the data input port 33 on the reader. Thus, the handheld reader interrogates the temp tag which receives the interrogation signal, activates the processor and data memory, and transmits its data to the reader. A microprocessor 34 in the reader may then present the data to the operator on a display 35.

The reader microprocessor 34 may be programmed with a temperature threshold 36 that indicates a possible problem with the shipment. The microprocessor may also be programmed with the alert conditions 27. For example, with a five-minute sampling rate, if the temp tag reports three consecutive readings outside of a predefined acceptable range, then the reader may activate a flashing light or other indicator 16 alerting the operator to the alert condition.

The reader 30 may also be equipped with a data memory 37 that stores the temperature readings from multiple temp tags. These readings may be downloaded from the reader through an interface such as an RS232 interface 38 to a personal computer (PC) 39 for further analysis. Alternatively, the reader may include a modem or a LAN connection.

It should be understood that the temp tag of the present invention is not limited to use with food distribution systems. The temp tag may be used with any shipped goods to monitor and record the temperature at a defined sampling rate during shipment of the goods. Additionally, the temp tag is useful in any situation in which it is desirable to have a historical record of the temperature variations for a particular device, location, or container.

It is thus believed that the operation and construction of the present invention will be apparent from the foregoing description. While the temperature tag and system shown and described has been characterized as being preferred, it will be readily apparent that various changes and modifications could be made therein without departing from the scope of the invention as defined in the following claims.

What is claimed is:

1. A temperature tag for sensing and recording an internal temperature inside a container, said tag comprising:
   a main body of a temperature tag
   a pointed shaft connected to the main body, said pointed shaft being constructed of a rigid material and having a pointed end suitable for piercing the container from an outside position, wherein when the pointed shaft pierces the container, the main body remains on the outside of the container while a portion of the pointed shaft extends into the interior of the container;
   a temperature sensor mounted in the portion of the pointed shaft proximate to the pointed end for sensing the internal temperature in the container when the pointed shaft pierces the container;
   a data memory connected to the temperature sensor for recording the sensed internal temperature; and
   means for retrieving the recorded temperature and providing the recorded temperature to a user upon demand.

2. The temperature tag of claim 1 wherein the means for retrieving the recorded temperature and providing the recorded temperature to a user upon demand includes:
   a visual display on the main body; and
   a microprocessor that retrieves the recorded temperature from the data memory and sends the retrieved temperature to the visual display.

3. The temperature tag of claim 1 wherein the means for retrieving the recorded temperature and providing the recorded temperature to a user includes:
   a data output port; and
   a microprocessor that retrieves the recorded temperature from the data memory and sends the recorded temperature to the data output port.

4. The temperature tag of claim 3 wherein the microprocessor includes:
   means for controlling the temperature sensor to report temperature readings at a predefined sampling rate; and
   means for recording in the data memory, a plurality of temperature sensor readings.

5. The temperature tag of claim 4 wherein the microprocessor also includes:
   means for analyzing the plurality of temperature sensor readings to determine whether a predefined alarm condition exists; and
   means for activating an alarm indicator upon determining that the predefined alarm condition exists.

6. The temperature tag of claim 5 further comprising a trigger input port located on the main body, said trigger input port receiving a request for temperature readings from the user, and sending the request to the microprocessor.

7. A system for sensing and reporting an internal temperature reading inside a container, said system comprising:
   a temperature tag comprising:
   a main body;
   a pointed shaft connected to the main body, said pointed shaft being constructed of a rigid material and having a pointed end suitable for piercing the container from an outside position, wherein when the pointed shaft pierces the container, the main body remains on the outside of the container while a portion of the pointed shaft extends into the interior of the container;

a temperature sensor mounted in the portion of the pointed shaft proximate to the pointed end for sensing the internal temperature in the container when the pointed shaft pierces the container; and means for sending the sensed internal temperature reading to an external reader device; and an external reader device that receives the sensed internal temperature reading from the temperature tag and presents the internal temperature reading to a user.

8. The system of claim 7 wherein the temperature tag includes:

a data memory for recording the sensed internal temperature reading;

a trigger input port on the main body for receiving a request for the sensed internal temperature reading from the reader device; and a data output port on the main body for sending the requested internal temperature reading to the reader device.

9. The system of claim 8 wherein the temperature tag also includes:

means for controlling the temperature sensor to report temperature readings at a predefined sampling rate; and means for recording in the data memory, a plurality of temperature sensor readings.

10. The system of claim 9 wherein the reader device includes:

means for requesting the plurality of temperature sensor readings from the temperature sensor;

means for analyzing the plurality of temperature sensor readings to determine whether a predefined alarm condition exists; and means for activating an alarm indicator upon determining that the predefined alarm condition exists.

11. The system of claim 9 further comprising a computer interfaced with the reader device, said computer including:

means for analyzing the plurality of temperature sensor readings to determine whether a predefined alarm condition exists; and means for activating an alarm indicator upon determining that the predefined alarm condition exists.

12. The system of claim 11 wherein the temperature tag also includes means for sending a container identification number along with the plurality of temperature readings so that the readings can be correlated to a particular container after the readings are downloaded to the computer.

13. The system of claim 7 wherein the trigger input port of the temperature tag is triggered by a signal of a type selected from a group consisting of:

an infrared signal;

a visible light signal;

a radio frequency signal;

a direct electrical contact signal; and a direct mechanical contact signal.

* * * * *